United States Patent [19]

Ferri

[11] 4,191,358
[45] Mar. 4, 1980

[54] SHUTOFF DEVICE

[75] Inventor: Johann W. Ferri, Uster, Switzerland

[73] Assignee: Luwa AG, Zurich, Switzerland

[21] Appl. No.: 895,042

[22] Filed: Apr. 10, 1978

[30] Foreign Application Priority Data

Apr. 15, 1977 [CH] Switzerland .................. 4692/77

[51] Int. Cl.² .............................................. F16K 7/07
[52] U.S. Cl. .................................... 251/5; 138/119;
138/121; 251/24
[58] Field of Search ................ 251/4, 5, 61.1;
138/119, 121

[56] References Cited
U.S. PATENT DOCUMENTS

| 2,746,709 | 5/1956 | Minor | 251/5 X |
| 3,235,064 | 2/1966 | Frost | 251/5 X |
| 3,918,674 | 11/1975 | Sutter | 251/5 |

FOREIGN PATENT DOCUMENTS 824365 11/1959 United Kingdom ............... 251/5

Primary Examiner—Irwin C. Cohen
Assistant Examiner—Richard Gerard
Attorney, Agent, or Firm—Werner W. Kleeman

[57] ABSTRACT

A shutoff device comprising a substantially tubular-shaped housing within which there is fixed at its ends an elastic hose body. The hose body extends in the lengthwise direction of the housing and forms a closable throughpassage which flow communicates an inlet opening of the housing with its outlet opening. The inner wall of the housing and the hose body bound a substantially ring-shaped pressure compartment into which opens a conduit connection arranged at the housing. The hose body has a number of folds which extend essentially parallel to one another.

8 Claims, 2 Drawing Figures

SHUTOFF DEVICE

BACKGROUND OF THE INVENTION

The present invention relates to a new and improved construction of a shutoff or closure device which is of the type comprising a substantially tubular-shaped housing and an elastic hose body which extends within and in the lengthwise direction of the housing and is secured at its ends at the housing. The hose body forms a closable throughpassage which flow communicates the inlet and outlet openings of the housing with one another, and a substantially ring-shaped pressure compartment or chamber is delimited by the housing inner wall and the hose body and into which opens a conduit connection arranged at the housing.

Shutoff devices of this type are also referred to in the art as hose valves. Owing to their extremely low susceptibility to contamination such hose valves are especially suitable for use in pneumatic transport conduits or lines, through which for instance there is removed by suction fiber fly, dust and other undesirable impurities or contaminants at spinning installations.

A state-of-the-art shutoff device of this type is known which comprises an approximately cylindrical hose body extending within the housing in the lengthwise direction thereof when the shutoff device is in its open position. If pressurized fluid medium, such as compressed air, is infed into the pressure compartment for the purpose of closing the shutoff device, then the hose body expands until at its intermediate region it comes to bear at a core portion piercingly extending through the center of the hose body, to thereby shutoff a throughflow passage or throughpassage. The expansion of the hose body at its intermediate or central region is so great that such is overloaded. The fissures or tears which form as a result thereof render further use of the hose body impossible after a relatively short period of use. The ozone contained in the air which flows through the hose body further promotes the formation of the fissures or tears.

SUMMARY OF THE INVENTION

Hence, with the foregoing in mind, it is a primary object of the present invention to provide a new and improved construction of shutoff device of the previously mentioned type wherein the hose body is structured such that it has a greater longevity in constrast to that of the prior art constructions.

Still a further significant object of the present invention aims at providing a new and improved construction of shutoff device which is relatively simple in design, economical to manufacture, extremely reliable in operation, requires a minimum of maintenance and servicing, and wherein the hose body is structured such that it can be used for greater periods of time.

Yet a further significant object of the present invention aims at the provision of a novel construction of hose body for use in a hose valve, imparting to the valve structure increased reliability due to extended service life of the hose body, thereby minimizing the maintenance and servicing requirements and increasing operational reliability of such hose valve.

Now in order to implement these and still further objects of the invention, which will become more readily apparent as the description proceeds, the general inventive concepts of the instant development contemplate constructing the hose body such that particularly at the regions of greatest expansion there is provided additional material. In particular, the hose body is constructed such that it possesses a plurality of folds or undulations or equivalent structure which extend essentially in parallelism to one another.

By virtue of the solution proposed by the invention the hose body possesses a wall having its surface greater than that of the state-of-the-art construction, so that the hose material, during closing of the shutoff device, is expanded or elongated to a lesser degree, and thus, exposed to lesser wear.

According to a preferred exemplary embodiment the folds can extend transversely of the hose body and can be arranged in rows which extend in lengthwise direction. Due to such construction there is obtained a subdivision of the folds in relation to the periphery of the hose body, so that there are defined predetermined zones which can arch or dome inwardly when there is applied thereat the compressed air or other pressurized fluid medium.

According to a further advantageous construction at least three rows of folds distributed at the same spacing from one another can be arranged at the periphery or circumference of the hose body and between each two neighboring rows of folds there can be arranged a respective longitudinal fold. The uniform distribution of the rows of folds produces a symmetrical arrangement in cross-section. The longitudinal folds between the mutually neighboring rows of folds facilitate the formation of the folds which is required in the lengthwise direction.

To enable the wall of the hose body to be able to fold as free as possible of joints at the region of the longitudinal or lengthwise fold, it is possible according to a further preferred construction to design the longitudinal fold in the manner of a hinge, and the hose body can have a lesser material thickness at the region of each such longitudinal fold than at the remaining regions. The longitudinal folds can also be constituted by point-like or circular-shaped depressions or recesses arranged in rows.

A particularly functionally advantageous cross-sectional shape is obtained if the hose body, in cross-section, is bounded by at least three curved or arc-shaped portions, the radius of curvature of which is greater than their effective spacing from the center and if the fold rows with the folds thereof confronting such center are arranged within such curved or arc-shaped portions. Due to the larger radius of curvature the cross-section of the hose body deviates from a circular ring. Since by virtue of this construction the doming of the curved or arc-shaped portions towards the outside is less, there is achieved the beneficial result that when there is applied compressed air at such curved portions the same can bend-through towards the inside with the application of a lesser amount of force, since such must be buckled to a lesser degree during passing through the region where such are linear.

A further advantageous construction which utilizes a core portion extending essentially into the throughflow passage, and which core portion forms at the periphery thereof a seating surface for the hose body, contemplates forming the core portion from a flexible material. With such construction there is obtained automatic centering of the core portion in relation to the hose body. Furthermore, due to this arrangement there is insured for an improved sealing of the throughpassage in the closed position of the shutoff device, because here the hose body itself must not close to the center of such hose body. The core portion can possess a hose having an open end terminating at the region of the throughpassage. The other end of such hose can be connected with the pressure compartment. The connection or flow communication of the open end of the core portion with the pressure compartment is accomplished during the opening movement, since a negative pressure is produced at the open end of the core portion due to the prevailing air flow. By virtue of such negative pressure there is a much more rapid venting of the substantially ring-shaped pressure compartment than if it were only opened to the atmosphere.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
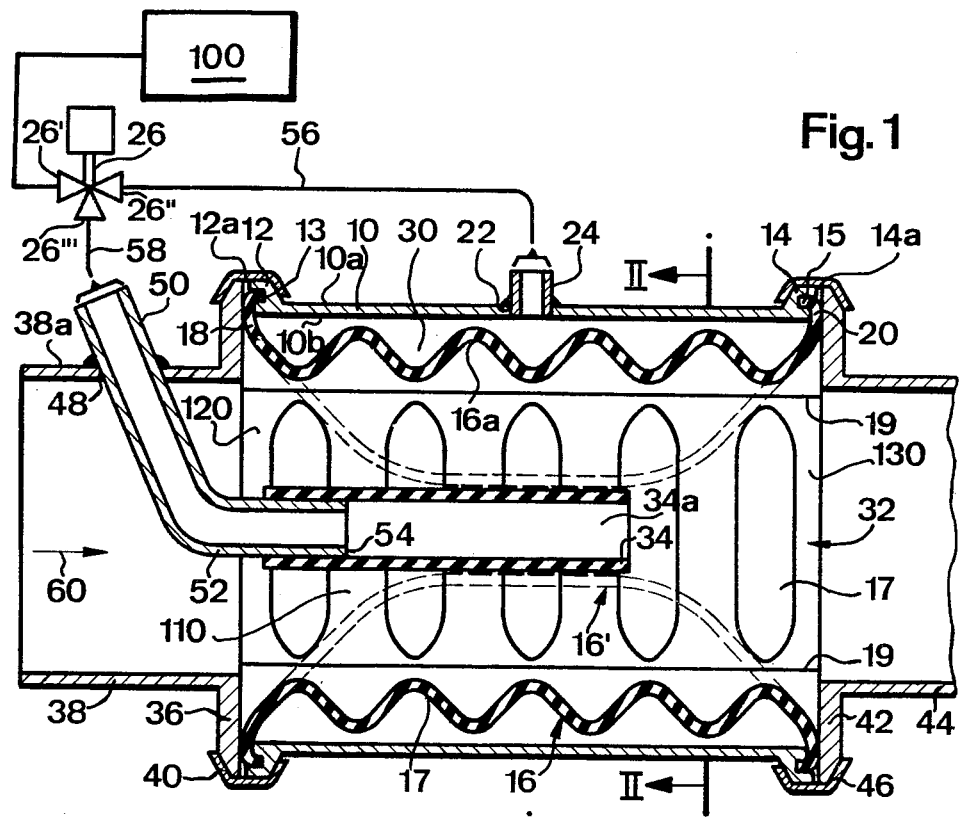
FIG. 1 is a longitudinal sectional view of a shutoff device constructed according to the teachings of the present invention, taken substantially along the line I—I of FIG. 2.

Describing now the drawings, there is shown therein an exemplary embodiment of shutoff device constructed according to the teachings of the present invention. Specifically, by referring to FIG. 1 there will be seen a substantially tubular-shaped housing 10 having at each of its ends a housing flange 12 and 14. At the end faces 12a and 14a of these flanges 12 and 14, respectively, there are provided substantially ring-shaped grooves 13 and 15 respectively. A hose body 16 extends in the lengthwise direction of the hollow tubular-shaped housing 10 and is retained at its extreme edges 18 and 20 in the grooves or recesses 13 and 15 respectively.

By means of a clamping ring 40 or other suitable clamping or fastening element there is attached a pipe or tubular section 38 to the housing flange 12. This pipe or tubular section 38 has a flange 36 and the clamping ring 40 engages over the flanges 12 and 36. At the housing flange 14 there is attached by means of a further clamping ring 46 or other appropriate fixing expedient a pipe or tubular section 44 having a flange 42. Again it will be seen that the clamping ring 46 clampingly engages over the adjoining flanges 14 and 42. The inner diameter of the flanged pipe or tubular sections 38 and 44, in the exemplary illustrated embodiment, approximately corresponds to the inner diameter of the elastic hose body 16.

The jacket or outer surface 38a of the tubular or pipe section 38 is provided with a bore or hole 48 through which piercingly extends a pipe 50 from the outside towards the inside, as shown. The end 52 of the pipe 50 which protrudes into the pipe section 38 is angled or bent, so that its mouth 54 is located at the center and parallel to the lengthwise or longitudinal axis of the tubular-shaped housing 10. A flexible hose member 34 is fitted onto the end 52 of the pipe 50. This hose or hose member 34 extends axially with respect to the tubular-shaped housing 10 approximately up to the central or intermediate region of such housing 10.

This tubular-shaped housing 10 will be seen to comprise a bore 22 which piercingly extends through its jacket or outer surface 10a. Seated and secured in such bore 22 is a pipe or conduit connection 24. The conduit connection 24 opens into a substantially ring-shaped pressure compartment or chamber 30 which is bounded by the tubular-shaped housing 10 i.e. its inner wall 10b and the hose body 16. This pressure compartment 30 is connected by means of the conduit connection 24 and a pipe conduit or line 56 with a connection 26" of a control valve 26. A connection 26''' of the control valve 26 is connected by means of a pipe conduit or line 58 with the pipe or conduit 50. By means of a connection 26' the control valve 26 can be operatively connected with any suitable source of pressurized fluid medium, such as the schematically indicated compressed air source 100.

Now based upon the showing of FIGS. 1 and 2 there will be explained hereinafter the construction of the elastic or flexible hose body 16. This hose body 16 will be seen to have longitudinal or lengthwise folds 19 extending in the lengthwise direction thereof and which are uniformly distributed about the periphery of such hose body 16. In the illustrated embodiment there are provided four such longitudinal or lengthwise folds 19. However, it would be possible for the hose body 16 to only have three such longitudinal folds 19 or more than four longitudinal folds. These longitudinal folds 19 are constructed in a hinge-like manner, i.e. provide hinges generally indicated by reference character 19' in FIG. 2. Each such longitudinal fold 19 can be constituted by rows of point-like or circular-shaped depressions 19''. The hose body 16 possesses a smaller material thickness at the region of each of the longitudinal folds 19 than at the remaining regions of such hose body. In cross-section the hose body 16 is bounded by curved or arc-shaped portions 28, each arranged between two neighboring longitudinal folds 19. These curved or arc-shaped portions 28 can have a radius such that the hose body 16 is of essentially circular cross-sectional configuration at the region of the section line II—II shown in FIG. 1. In the illustrated embodiment as disclosed in FIG. 2, such curved portions 28 however have a radius of curvature which is greater than their effective or actual spacing from the center of the hose body 16. At the region of the curved portions 28 the hose body 16 has a number of undulated or wave-shaped folds 17 extending essentially in parallelism to one another and in the transverse direction with regard to the hose body. In the illustrated arrangement there are shown four fold rows 32 disposed at essentially right angles to one another and extending in the lengthwise direction.

The disclosed shutoff device serves for shutting off the throughpassage or throughflow passage 110 extending from the inlet opening 120 of the housing 10 which neighbors the tubular section 38 to the outlet opening 130 neighboring the tubular or pipe section 44. The arrow 60 indicates the direction of flow of the air through the shutoff device. If this air flow is to be interrupted, then the control valve 26 delivers compressed air which is infed by means of its connection 26' through the pipe conduit or line 56 and the conduit connection 24 into the pressure compartment 30. By virtue of the blown-in compressed air the pressure compartment 30 enlarges inasmuch as the hose body 16 assumes the position shown in phantom lines by reference character 16'. As a result the hose body 16 bears against the hose member or hose 34 serving as a core portion and encloses such hose 34, so that the throughpassage 110 between the pipe sections 38 and 44 is now closed. The elastic hose body 16 and hose 34 can be formed of any suitable stretchable or extendable material, such as rubber for instance or other elastomeric material.

Figure 2:
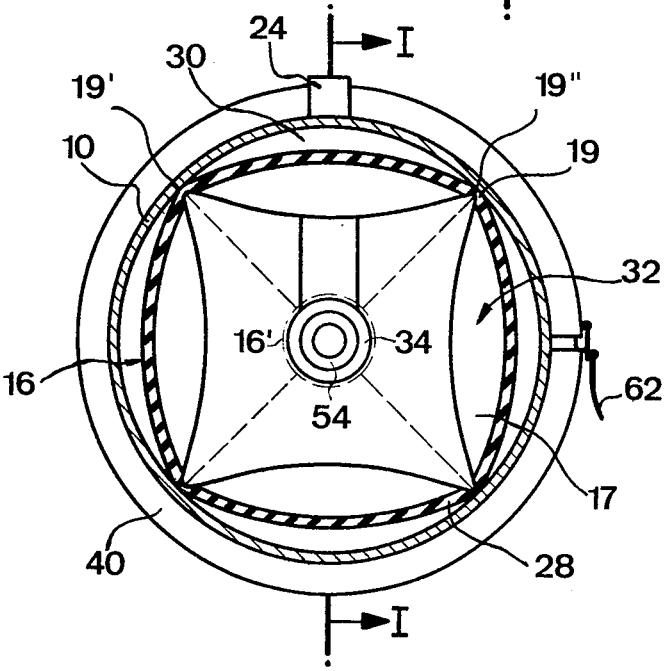
FIG. 2 is a cross-sectional view of the shutoff device shown in FIG. 1, taken substantially along the line II—II thereof.

From the showing of FIG. 2 it will also be evident that the hose body 16, when assuming the phantom line position 16', in cross-section forms four phantom line illustrated sectorlike regions, since the inner walls 16a of the hose body 16, starting from the longitudinal folds 19, fold inwardly. The transverse folds 17, on the other hand, are extended, as will be seen at the phantom line position 16' shown in FIG. 1.

Due to the arrangement of the transverse folds 17 the hose body 16 has a sufficient amount of material, so that when such hose body 16 assumes the phantom line position 16' it will no longer be over-extended or expanded. By virtue of the arrangement of the longitudinal folds 19, at the region of which there are not present any transverse folds 17, there are defined predetermined fold lines. Such facilitate the folding together of the hose body 16 and insure for adequate sealing action of the closed shutoff device.

The elastic hose 34 which acts as a core portion renders possible automatic centering of the hose body 16 during the shutoff operation, since it compensates for any non-symmetry of the hose body 16 and at the same time assumes the function of a valve seat.

In order to fill the pressure compartment 30 with compressed air the control valve 26 flow communicates its connection 26' with its further connection 26''. The third connection 26''' is then closed. On the other hand if the shutoff device again should be opened, then the control valve 26 flow communicates the connection 26'' with the connection 26''', and now the connection 26' which is in flow communication with the compressed air source 100 is closed. The air emanating from the pressure compartment 30 now can escape by means of the conduit connection 24, the pipe conduit or line 56, the valve connections 26'' and 26''', the pipe conduit or line 58, the pipe 50 and the hose 34. By virtue of the air flow which is again present in the direction of the arrow 60 and through the shutoff device there is accelerated venting or emptying of the pressure compartment 30 due to the suction action which is exerted at the mouth or exit portion 34a of the hose 34.

Moreover, it will be apparent from the showing of FIG. 2 that the clamping ring 40 possesses a closure device 62. The hose body 16 bears at the region of its longitudinal or lengthwise folds 19 at the inner wall 10b of the tubular-shaped housing 10. The elongation or expansion of the regions of the hose body 16 neighboring the longitudinal folds 19 in the peripheral or circumferential direction can amount to preferably 2% to 25% of the region provided with the folds 17. It is also conceivable for the folds to extend over the entire periphery of the hose body 16.

In the exemplary embodiment under discussion the folds 17 extend in the transverse direction with regard to the hose body 16. However, it is also possible for the hose body 16 to be constructed such that the folds extend in the lengthwise direction of the hose body, since also with this modified construction there is available sufficient material to prevent any over-expansion or elongation of the hose body.

Due to the inventive construction of the hose body 16 lesser pressure is needed in the pressure compartment or chamber 30 for closing the shutoff device than for instance would be required in the case of a cylindrical hose body devoid of any folds. The shutoff or closing pressure, with the inventive exemplary embodiment, is in the order of about 0.2 kg/cm$^2$.

The wall thickness of the hose body 16 preferably can be selected such that it is greater at the regions having increased elongation in relation to those regions having lesser elongation.

The invention provides a hose body made of synthetic rubber having an increased longevity despite its lower elasticity compared with natural rubber because the arrangement of folds according to the present invention results in a reclined expansion and because synthetic rubber has a higher resistence to ozone than natural rubber.

While there are shown and described present preferred embodiments of the invention, it is to be distinctly understood that the invention is not limited thereto, but may be otherwise variously embodied and practiced within the scope of the following claims.

Accordingly, what I claim is:

1. A shutoff device comprising:
   a substantially tubular-shaped housing;
   said housing having opposed ends;
   one end of said housing forming an inlet opening and the other end of said housing an outlet opening;
   said housing having an inner housing wall;
   an elastic hose body having opposed ends;
   means for securing the ends of said elastic hose body at the housing;
   said elastic hose body defining a closable throughflow passage which flow communicates said inlet opening with said outlet opening;
   said elastic hose body in conjunction with said inner wall of said housing forming a substantially ring-shaped pressure compartment;
   a conduit connection arranged at said housing and opening into said ring-shaped pressure compartment;
   said hose body having a number of folds extending essentially in parallelism to one another; and
   said folds extending transversely with respect to said hose body and being arranged in rows extending in the lengthwise direction thereof.

2. The shutoff device as defined in claim 1, wherein:
   at least three rows of said folds are distributively arranged at essentially the same spacing from one another about the circumference of said hose body; and
   a respective longitudinal fold arranged between each two neighboring rows of folds.

3. The shutoff device as defined in claim 1, wherein:
   each of said longitudinal folds possesses a hinge-like structure; and
   said hose body having a smaller material thickness at the region of each of the longitudinal folds than at its remaining regions.

4. The shutoff device as defined in claim 2, wherein:
   each of said longitudinal folds comprise substantially point-like depressions arranged in rows.

5. The shutoff device as defined in claim 2, wherein:
   each of said longitudinal folds comprise substantially circular-shaped depressions arranged in rows.

6. The shutoff device as defined in claim 1, wherein:

said hose body, in cross-section, is bounded by at least three curved portions;

each of said curved portions having a radius of curvature which is greater than its actual spacing from the center of the hose body; and said rows of folds with the folds thereof confronting the center of the hose body being arranged internally of said curved portions.

7. The shutoff device as defined in claim 1, further including:

means defining a core portion extending centrally into said throughflow passage;

said core portion defining seating means at its periphery for said hose body;

said core portion being formed of a flexible material.

8. The shutoff device as defined in claim 7, wherein:

said core portion comprises a hose which has an open end terminating at the region of said throughflow passage;

said hose having a further end remote from said open end; and means for flow communicating said further end with said pressure compartment.

* * * * *